(12) United States Patent

Ragland et al.

(10) Patent No.: US 12,565,277 B2

(45) Date of Patent: Mar. 3, 2026

(54) BATTERY SUPPORT FRAME FOR A BICYCLE

(71) Applicant: StaCyc, LLC, Fort Worth, TX (US)

(72) Inventors: Robert Ryan Ragland, Brock, TX (US); Lawrence Michael Paige, Springtown, TX (US); Jamie Richard Beckett, Aledo, TX (US)

(73) Assignee: StaCyc, LLC, Fort Worth, TX (US)

( * ) Notice: Subject to any disclaimer, the term of this patent is extended or adjusted under 35 U.S.C. 154(b) by 598 days.

(21) Appl. No.: 18/166,736

(22) Filed: Feb. 9, 2023

(65) Prior Publication Data

US 2024/0274958 A1 Aug. 15, 2024

(51) Int. Cl.
| | |
|---|---|
| *B62J 43/16* | (2020.01) |
| *B60K 1/04* | (2019.01) |
| *B62M 7/02* | (2006.01) |

(52) U.S. Cl.
CPC ................. *B62J 43/16* (2020.02); *B60K 1/04* (2013.01); *B62M 7/02* (2013.01)

(58) Field of Classification Search
CPC ... B60K 1/04; B62M 7/02; B60L 50/66; B62J 43/16
See application file for complete search history.

(56) References Cited

U.S. PATENT DOCUMENTS

| | | |
|---|---|---|
| 3,841,428 A | 10/1974 | Bialek |
| 4,325,565 A | 4/1982 | Winchell |
| RE32,031 E | 11/1985 | Winchell |
| 5,090,715 A | 2/1992 | Nakajima |
| 5,491,390 A | 2/1996 | McGreen |
| 5,915,493 A | 6/1999 | Nakayama |

(Continued)

FOREIGN PATENT DOCUMENTS

| | | |
|---|---|---|
| AT | 15420 U1 | 8/2017 |
| CN | 201049678 Y | 4/2008 |

(Continued)

OTHER PUBLICATIONS

International Search Report and Written Opinion for Application No. PCT/US2024/13961 dated Jul. 15, 2024 (14 Pages).

(Continued)

*Primary Examiner* — Kevin Hurley

(74) *Attorney, Agent, or Firm* — Michael Best & Friedrich LLP

(57) ABSTRACT

A battery mount includes a first portion, a second portion selectively coupled to the first portion, a battery connection interface defined by the first and second portions, and a connection terminal supported within the battery connection interface. A battery support frame defines a support rail configured to be positioned within the battery connection interface. The battery support frame is configured to be removably coupled to the battery mount by an interlock interface defined by the first and second portions of the battery mount and the battery support frame. A battery pack is selectively received within the battery connection interface. The battery pack includes a corresponding interface that interacts with the battery connection interface, the support rail, and the connection terminal to provide a mechanical and an electrical interface between the battery pack and the battery mount to selectively provide power to a drive module.

20 Claims, 7 Drawing Sheets

(56) References Cited

U.S. PATENT DOCUMENTS

| | | | |
|---|---|---|---|
| 6,012,538 | A | 1/2000 | Sonobe et al. |
| 6,039,137 | A | 3/2000 | Schless |
| 6,095,270 | A | 8/2000 | Ishikawa |
| 6,276,479 | B1 | 8/2001 | Suzuki et al. |
| 6,655,705 | B2 | 12/2003 | Turgeon |
| 6,880,661 | B1 | 4/2005 | Oh |
| 7,513,520 | B2 | 4/2009 | Okuyama |
| D629,049 | S | 12/2010 | McFarland |
| 7,997,604 | B2 | 8/2011 | Griep et al. |
| 8,414,007 | B2 | 4/2013 | Chen |
| 8,617,730 | B2 | 12/2013 | Tsukamoto et al. |
| 8,672,077 | B2 | 3/2014 | Sand et al. |
| 8,881,857 | B2 | 11/2014 | Binggeli et al. |
| 8,967,641 | B2 | 3/2015 | De Roeck |
| 9,120,532 | B2 | 9/2015 | Huang |
| 9,193,411 | B2 | 11/2015 | Sand et al. |
| 9,403,574 | B2 | 8/2016 | Sand et al. |
| D774,971 | S | 12/2016 | Lambri et al. |
| 9,580,141 | B2 * | 2/2017 | Talavasek ............... B62M 6/40 |
| 9,616,966 | B2 | 4/2017 | Talavasek et al. |
| 9,777,774 | B2 | 10/2017 | Biechele |
| 9,937,975 | B2 * | 4/2018 | Ragland ................. B62K 13/00 |
| 10,518,841 | B2 | 12/2019 | Talavasek et al. |
| 10,696,355 | B2 | 6/2020 | Talavasek et al. |
| 10,730,584 | B2 * | 8/2020 | Ragland ................... B62J 25/04 |
| 10,800,476 | B1 | 10/2020 | Thienphrapa |
| 10,850,805 | B1 | 12/2020 | Noda et al. |
| 10,906,609 | B2 * | 2/2021 | Talavasek ............... B62M 6/50 |
| 10,906,610 | B2 | 2/2021 | Talavasek et al. |
| D918,781 | S | 5/2021 | Hüttl et al. |
| D919,484 | S | 5/2021 | Von Schöning et al. |
| 11,046,389 | B2 | 6/2021 | Talavasek et al. |
| D924,733 | S | 7/2021 | Lin |
| 11,117,634 | B2 | 9/2021 | Talavasek et al. |
| 11,124,259 | B2 | 9/2021 | Talavasek et al. |
| 11,161,567 | B2 | 11/2021 | Eguchi |
| 11,242,106 | B2 * | 2/2022 | Chen ........................ B62J 43/16 |
| 11,325,678 | B2 | 5/2022 | Wecker et al. |
| 11,345,437 | B2 | 5/2022 | Talavasek et al. |
| 11,383,792 | B1 | 7/2022 | Thienphrapa |
| D962,828 | S | 9/2022 | Chen |
| D972,459 | S | 12/2022 | Wen |
| D975,598 | S | 1/2023 | Gray et al. |
| 11,603,165 | B2 * | 3/2023 | Ragland ................. B62K 19/40 |
| D1,005,891 | S | 11/2023 | Li |
| 11,975,799 | B2 | 5/2024 | Ragland et al. |
| D1,029,695 | S | 6/2024 | Yi |
| D1,031,527 | S | 6/2024 | Li |
| D1,031,531 | S | 6/2024 | Lin |
| D1,032,416 | S | 6/2024 | Zhang et al. |
| D1,043,450 | S | 9/2024 | Horuz |
| 2002/0046891 | A1 | 4/2002 | Honda et al. |
| 2005/0087379 | A1 | 4/2005 | Holland |
| 2005/0140115 | A1 | 6/2005 | Francis et al. |
| 2009/0161903 | A1 | 6/2009 | White |
| 2010/0052287 | A1 | 3/2010 | McFarland |
| 2010/0148460 | A1 | 6/2010 | Nelson et al. |
| 2010/0175942 | A1 | 7/2010 | Griep et al. |
| 2010/0206652 | A1 | 8/2010 | Kielland |
| 2011/0124454 | A1 | 5/2011 | Song |
| 2011/0284303 | A1 | 11/2011 | Shwartz |
| 2012/0000724 | A1 | 1/2012 | Mimura et al. |
| 2012/0234636 | A1 | 9/2012 | McFarland |
| 2013/0020777 | A1 | 1/2013 | Chen |
| 2013/0032425 | A1 | 2/2013 | Lee et al. |
| 2013/0081894 | A1 | 4/2013 | Ishikawa et al. |
| 2013/0177196 | A1 | 7/2013 | Lee |
| 2013/0231810 | A1 | 9/2013 | Garcia |
| 2013/0288841 | A1 | 10/2013 | Yoshino et al. |
| 2014/0076097 | A1 | 3/2014 | Stewart |
| 2014/0077470 | A1 | 3/2014 | Chen |
| 2014/0319907 | A1 | 10/2014 | Yamazaki |
| 2014/0336858 | A1 | 11/2014 | Matsushima et al. |
| 2014/0379209 | A1 | 12/2014 | Matsuda |
| 2016/0297499 | A1 | 10/2016 | Ohashi et al. |
| 2017/0088013 | A1 | 3/2017 | Shimizu et al. |
| 2018/0029497 | A1 | 2/2018 | Shieh |
| 2018/0072380 | A1 | 3/2018 | Talavasek et al. |
| 2018/0241022 | A1 | 8/2018 | Nishihara et al. |
| 2018/0327040 | A1 | 11/2018 | Spicer |
| 2019/0039677 | A1 | 2/2019 | Noda et al. |
| 2019/0039687 | A1 | 2/2019 | Lay et al. |
| 2019/0112000 | A1 | 4/2019 | Noda et al. |
| 2020/0062325 | A1 | 2/2020 | Talavasek et al. |
| 2020/0062329 | A1 | 2/2020 | Talavasek et al. |
| 2020/0062339 | A1 | 2/2020 | Talavasek et al. |
| 2020/0062341 | A1 | 2/2020 | Talavasek et al. |
| 2020/0062342 | A1 | 2/2020 | Talavasek et al. |
| 2020/0079471 | A1 | 3/2020 | Eguchi |
| 2020/0247501 | A1 | 8/2020 | Kameda et al. |
| 2020/0247502 | A1 | 8/2020 | Mitsuyasu et al. |
| 2020/0354019 | A1 | 11/2020 | Ragland et al. |
| 2020/0385080 | A1 | 12/2020 | Chen et al. |
| 2021/0269118 | A1 | 9/2021 | Nishimori et al. |
| 2021/0269119 | A1 | 9/2021 | Boehnke et al. |
| 2021/0380192 | A1 | 12/2021 | Demond |
| 2022/0281552 | A1 | 9/2022 | Liao |
| 2022/0281555 | A1 * | 9/2022 | Ragland ................... B62J 43/16 |
| 2022/0306240 | A1 | 9/2022 | Talavasek et al. |
| 2023/0062161 | A1 | 3/2023 | Wakuta |

FOREIGN PATENT DOCUMENTS

| | | |
|---|---|---|
| CN | 201086768 Y | 7/2008 |
| CN | 102390468 A | 3/2012 |
| CN | 102447085 A | 5/2012 |
| CN | 103303400 A | 9/2013 |
| CN | 103359253 A | 10/2013 |
| CN | 203581244 U | 5/2014 |
| CN | 210083435 U | 2/2020 |
| DE | 102011079094 A1 | 7/2012 |
| DE | 202012104843 U1 | 1/2013 |
| DE | 202016102118 U1 | 8/2017 |
| DE | 202017003772 U1 | 8/2017 |
| DE | 202016104758 U1 | 12/2017 |
| DE | 202017004040 U1 | 11/2018 |
| DE | 102017006574 A1 | 1/2019 |
| DE | 202019106361 U1 | 1/2020 |
| DE | 102020100712 A1 | 8/2020 |
| DE | 102020100724 A1 | 8/2020 |
| DE | 102020134352 A1 | 7/2021 |
| EP | 1092826 A1 | 10/2000 |
| EP | 2230164 B1 | 5/2012 |
| EP | 2957494 A1 | 12/2015 |
| EP | 3109145 A1 | 12/2016 |
| EP | 2731858 B1 | 1/2017 |
| EP | 2739522 B1 | 9/2017 |
| EP | 3437977 A1 | 2/2019 |
| EP | 3109146 B1 | 9/2019 |
| EP | 3191361 B1 | 9/2019 |
| EP | 3620362 A1 | 3/2020 |
| FR | 3064242 A1 | 9/2018 |
| FR | 3065704 A1 | 11/2018 |
| GB | 2511522 A | 9/2014 |
| JP | 2013147153 A | 8/2013 |
| JP | 2019031263 A | 2/2019 |
| KR | 20090103259 A | 10/2009 |
| NL | 2021658 B1 | 5/2020 |
| TW | M581557 U | 8/2019 |
| TW | M582478 U | 8/2019 |
| WO | WO2013050193 A1 | 4/2013 |
| WO | WO2013150411 A1 | 10/2013 |
| WO | WO2016206731 A1 | 12/2016 |
| WO | WO2018042269 A1 | 3/2018 |
| WO | 2020007496 A1 | 1/2020 |
| WO | WO2020041425 A1 | 2/2020 |
| WO | 2020097637 A1 | 5/2020 |
| WO | 2022172776 A1 | 8/2022 |

OTHER PUBLICATIONS

International Search Report and Written Opinion for Application No. PCT/US2024/13961 dated Jul. 29, 2024 (13 pages).

(56) References Cited

OTHER PUBLICATIONS

"OSET Bikes" Oct. 9, 2015, < http://www.osetbikes.com/us> Accessed Feb. 24, 2016.

"Kuberg Start" Oct. 9, 2015, < http://www.kuberg.com/p-2-start.aspx/> Accessed Feb. 24, 2016.

"MX650—Dirt Rides, Supercross Inspired" Oct. 9, 2015, <http://www.razor.com/products/dirt/mx650/> Accessed Feb. 24, 2016.

"Strider Bikes—We love inspiring kids to ride" Oct. 9, 2015, < http://www.striderbikes.com> Accessed Feb. 24, J016.

"Pro Mini 12" | Muna Bikes Oct. 9, 2015, < http://www.munabikes.com/index.php/boys- bikes/pro-mini-12> Accessed Feb. 24, 2016.

"Hyper Motorbike Boys' 36-Volt Electric Bike—Walmart.com" Oct. 9, 2015, <http://www.walmart.com/ip/Hyper- Motobike-Boys-36-Volt-Electric-Bike/23149110> Accessed Feb. 24, 2016.

"Electric strider—YouTube" Oct. 9, 2015, <http://www.youtube.com/watch?v=hDwzR6nBsns> Accessed Feb. 24, 2016.

ZhuMin, "Metalworking Practice 2nd Edition", Chengdu: Southwest Jiaotong University Press, Jan. 2012 (pp. 173-175 with English Translation).

Cycle News, Stacyc 18eDrive & 20eDrive, https://www.cyclenews.com/2022/04/article/stacyc-18edrive-20edrive/, Apr. 27, 2022.

Motosport, STACYC 20eDrive Stability Cycle—2022 Launch Edition, Nov. 30, 2022, https://www.motosport.com/stacyc-20edrive-stability-cycle-2022-launch-edition?variant[SCY0017 ]=SCY0017-X001-Y001.

Trials Bike, Sherco EB12 Electric Balance Bike $635.45, https://www.trialsbike.com.au/product/sherco-eb12-electric-balance-bike/, available as early as Mar. 16, 2022.

Youtube, "20eDRIVE Team Edition Tech," Aug. 7, 2023, https://www.youtube.com/watch?v=wQbems_3XBI&list=TLGGfxawwmG_qi UwOTExMjAyMw.

Youtube, "STACYC 18eDrive & 20eDrive Electric Balance Bikes Review," Nov. 30, 2022, https://www.youtube.com/watch?v=AA4_EToLtH8&t=5s.

International Preliminary Report on Patentability for Application No. PCT/US2024/013961 dated Aug. 21, 2025 (12 pages).

\* cited by examiner

BATTERY SUPPORT FRAME FOR A BICYCLE

BACKGROUND

An electric bicycle may include a drivetrain assembly (e.g., including an electric motor) and a battery that powers the drivetrain assembly.

SUMMARY

In one aspect, the invention provides a bike including a frame elongated in a longitudinal direction, a front fork rotatably engaged with a front wheel at a front end of the bike, a rear fork rotatably engaged with a rear wheel at a rear end of the bike, a handlebar supported with the front fork for rotation at the front end of the frame for steering the bike, a drive module configured to drive the rear wheel of the bike when operated selectively with power, and a battery mount coupled to the frame. The battery mount including a first portion, a second portion selectively coupled to the first portion, a battery connection interface defined by the first and second portions, and a connection terminal supported within the battery connection interface. A battery support frame defining a support rail configured to be positioned within the battery connection interface. The battery support frame configured to be removably coupled to the battery mount by an interlock interface defined by the first and second portions of the battery mount and the battery support frame. A battery pack selectively received within the battery connection interface. The battery pack including a corresponding interface that interacts with the battery connection interface, the support rail, and the connection terminal to provide a mechanical and an electrical interface between the battery pack and the battery mount to selectively provide power to the drive module.

In another aspect, the invention provides a bike including a frame elongated in a longitudinal direction, a front fork rotatably engaged with a front wheel at a front end of the bike, a rear fork rotatably engaged with a rear wheel at a rear end of the bike, a handlebar supported with the front fork for rotation at the front end of the frame for steering the bike, a drive module configured to drive the rear wheel of the bike when operated selectively with power, a first side panel configured to be coupled to a first side of the bike, and a second side panel configured to be coupled to a second side of the bike. The first and second side panels define a battery mount having a battery connection interface. A connection terminal supported within the battery connection interface, and a battery support frame defining a support rail configured to be positioned within the battery connection interface. The battery support frame configured to be removably coupled to the battery mount by an interlock interface defined by the first and second side panels and the battery support frame. A battery pack selectively received within the battery connection interface. The battery pack including a corresponding interface that interacts with the battery connection interface, the support rail, and the connection terminal to provide a mechanical and an electrical interface between the battery pack and the battery mount to selectively provide power to the drive module.

In another aspect, the invention provides a method of assembling a bike. The method including providing a frame elongated in a longitudinal direction, coupling a drive module to the frame, the drive module configured to selectively provide power to the bike, coupling a first side panel to the frame, the first side panel defining a first portion of a battery mount, coupling a battery support frame to the first side panel, the battery support frame defining a support rail, and coupling a second side panel to the frame and the first side panel, the second side panel defining a second portion of the battery mount. Coupling the second side panel to the first side panel defines a battery connection interface of the battery mount and couples the battery support frame to the battery mount by an interlock interface so the support rail is positioned within the battery connection interface.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
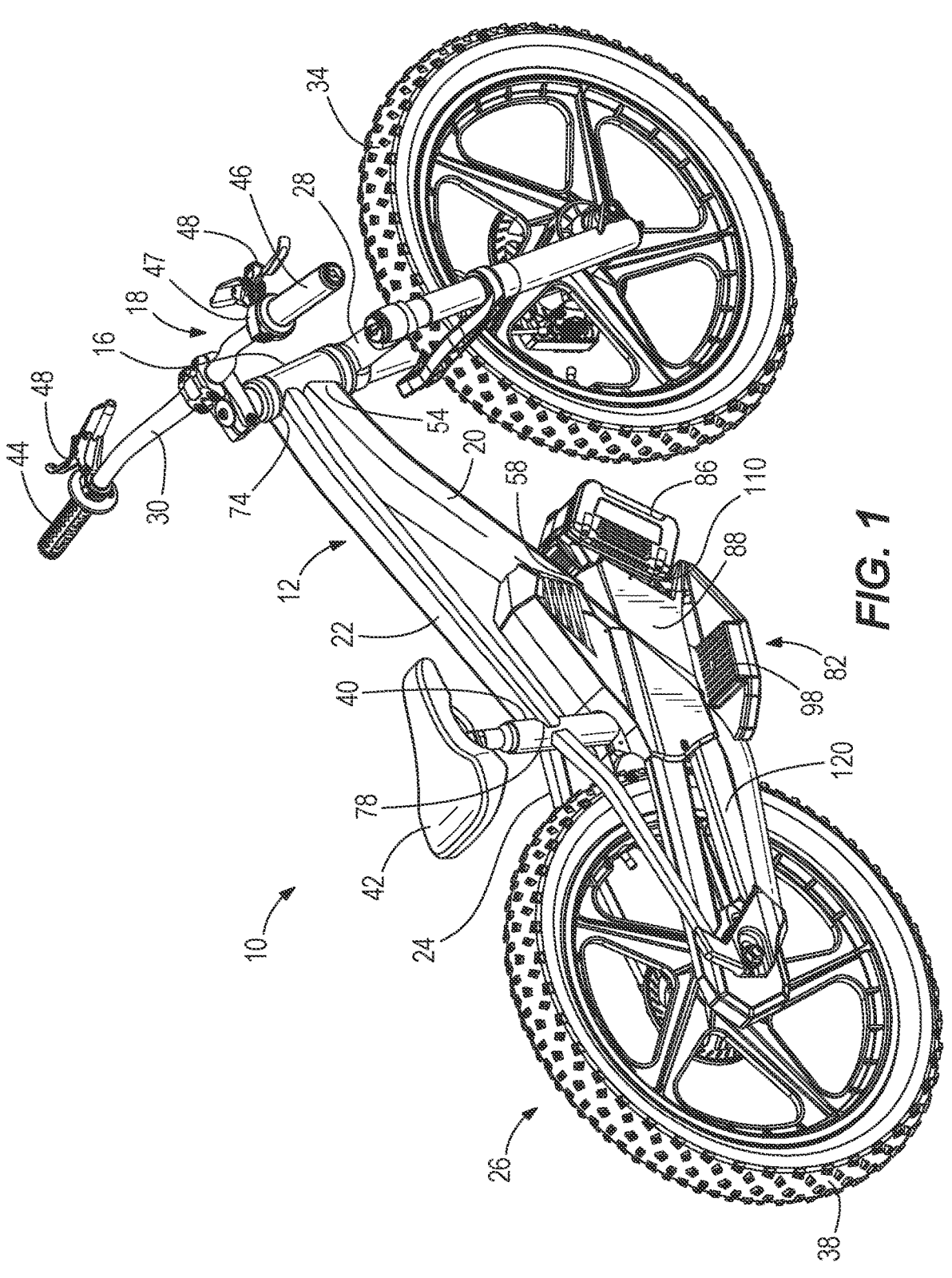
FIG. 1 is a perspective view of a running bike according to an embodiment of the invention.
Figure 2:
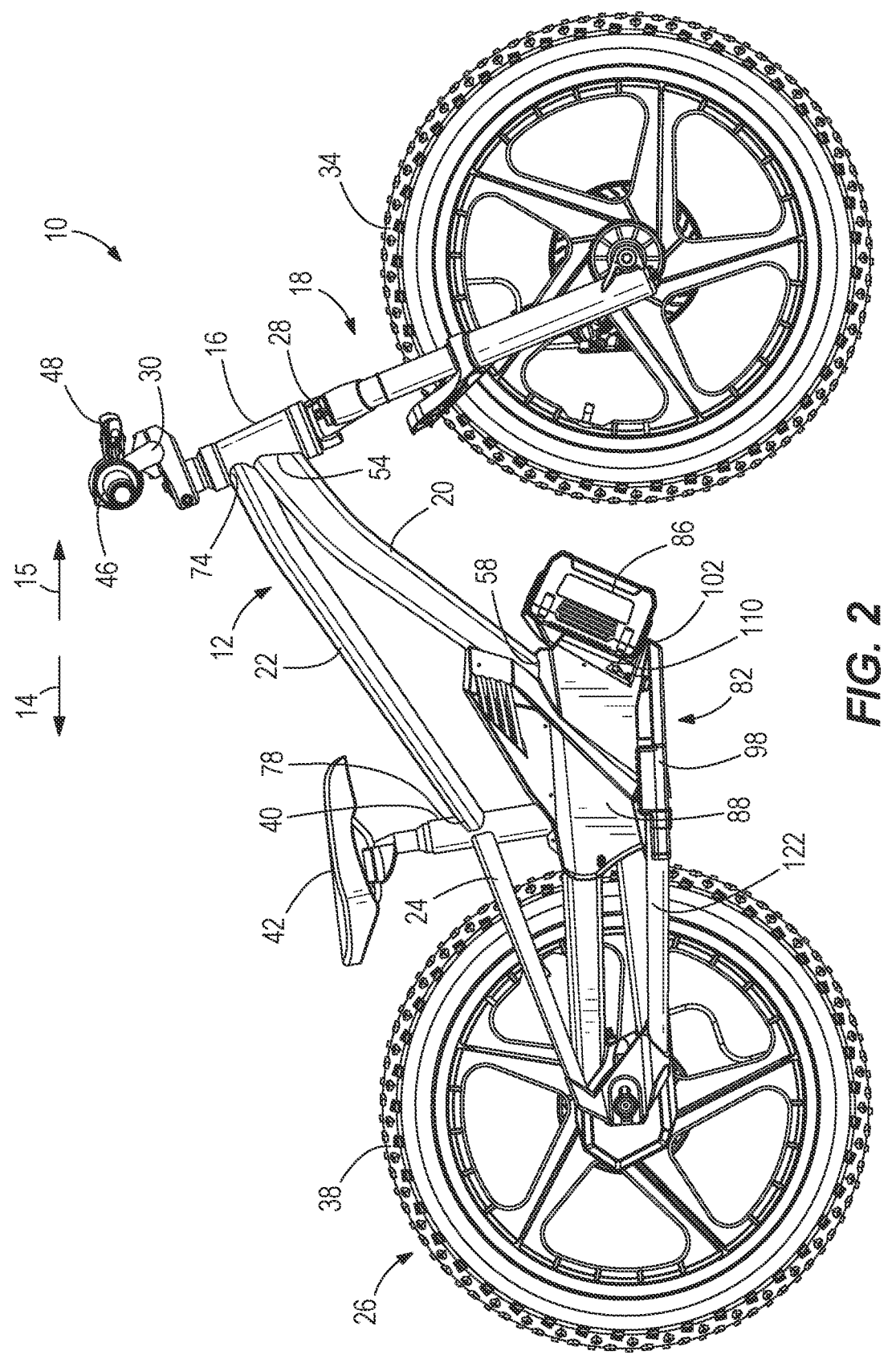
FIG. 2 is a first side view of the running bike of FIG. 1.
Figure 3:
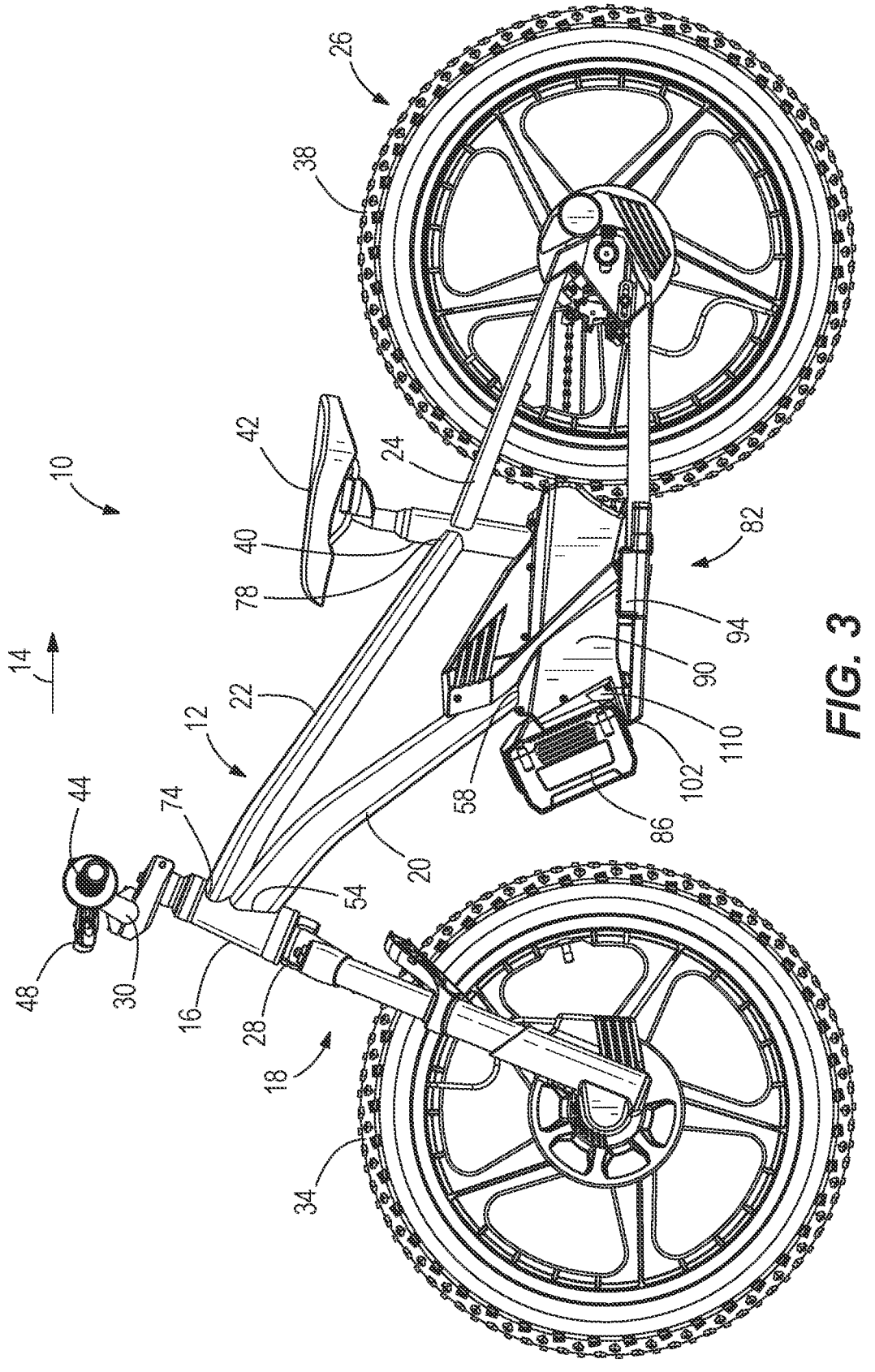
FIG. 3 is a second side view of the running bike of FIG. 1.

FIGS. 1-4 illustrate a bike 10 configured for example as a balance bike or running bike and including a frame 12 elongated in a longitudinal direction. The longitudinal direction can be taken as a front-rear direction 14 of the running bike 10 or the opposing rear-front 15 direction (FIGS. 2 and 3). The frame 12 includes a head tube 16, a down tube 20 extending downward and rearward from the head tube 16, a top tube 22 extending rearward from the head tube 16, and a rear fork 24. The area proximate the head tube 16 defines a front end 18 of the frame 12 and the running bike 10. The area proximate the rear fork 24 defines a rear end 26 of the frame 12 and the running bike 10. The head tube 16 is sized to receive and rotatably support a front fork 28 and a handlebar 30 to steer the bike 10.

A front wheel 34 is rotatably connected to the front fork 28, and a rear wheel 38 is rotatably connected to the rear fork 24. In the illustrated embodiment, the front fork 28 includes a suspension system and the rear fork 24 is a rigid fork. In other embodiments, the front fork 28 may be devoid of the suspension system or the rear fork 24 may include a rear suspension system. A seat tube 40 is positioned between and coupled to the top tube 22 and the rear fork 24. The seat tube 40 is sized to receive the post of a seat 42, the seat being adjustable relative to the top tube 22 and configured to support an operator on the bike 10.

In the illustrated embodiment, the head tube 16 defines a cylindrical receptacle that houses a set of bearings (not shown) that rotatably support the front fork 28 and the handlebar 30 within the head tube 16. In addition, the front and rear wheels 34, 38 are respectively connected to the front and rear forks 28, 24 by conventional bicycle axle hardware such as nuts, bolts, and bearings and are operable to support the running bike 10 relative to the ground.

The handlebar 30 includes left and right grips 44, 46, at least one of which may function as a throttle input to a drive module 70. For example, the right grip 46 may be integrated with a throttle sensor 47 so the operator can twist the grip 46 relative to the handlebar 30 in order to adjust the amount of power provided to the drive module 70. In other embodiments, alternative throttles may be used such as a thumb lever throttle or the like. One or more brake levers 48 are coupled to the handlebar 30 to selectively activate front or rear brake systems. For example, two brake levers 48 can independently control front and rear brake systems. While the disclosure is described in terms of an electric bike ("E-bike") in the form of a running bike, which may be configured for use by toddlers or small children (and selectively operable as an unpowered balance bike), it should be appreciated that aspects of the disclosure may be used for other types of electric bikes such as those configured for use by older children or even adults.

With continued reference to FIGS. 1-4, the down tube 20 includes a first end 54 connected to the head tube 16 and a second end 58 opposite the first end 54. A drive module enclosure 62 is formed at the second end 58 of the down tube 20. The drive module enclosure 62 defines a drive module receptacle 66 (FIG. 4) open in the longitudinal direction of the running bike 10. In the illustrated embodiment, the drive module receptacle 66 is open in both the front-rear direction 14 and the rear-front direction 15 (FIGS. 2 and 3). The drive module receptacle 66 is sized to receive a drive module 70 of the drive module 70. In the illustrated embodiment, the drive module receptable 66 is open exclusively in the longitudinal direction such that the drive module enclosure 62 precludes installation of the drive module 70 from a lateral direction. In the illustrated embodiment, the drive module receptacle is integral with the down tube 20 (e.g., welded together or formed as a single casting) as opposed to being removably secured via fasteners. In other embodiments, the drive module enclosure 62 may be removably attached to the down tube 20. The drive module enclosure 62 forms a tunnel for receiving at least a portion of the drive module 70 when assembled into operational configuration. The drive module enclosure 62 can be open at both front and rear ends thereof. The drive module enclosure 62 includes a top portion coupled to the second end 58 of the down tube 20 and a bottom portion coupled to the rear fork 24.

The down tube 20 includes a curvilinear profile that provides additional clearance between the front wheel 34 and the down tube 20 as compared to a straight line between the ends 54, 58. The top tube 22 has a first end 74 connected to the head tube 16 and a second end 78 coupled to the rear fork 24. In other embodiments, the first end 74 of the top tube 22 may be connected to the down tube 20. In the illustrated embodiment, the down tube 20 and the top tube 22 each have a generally rectangular cross-section profile. In other embodiments, the down tube and/or the top tube 22 may have alternative geometry (e.g., a circular geometry, or the like).

Figure 4:
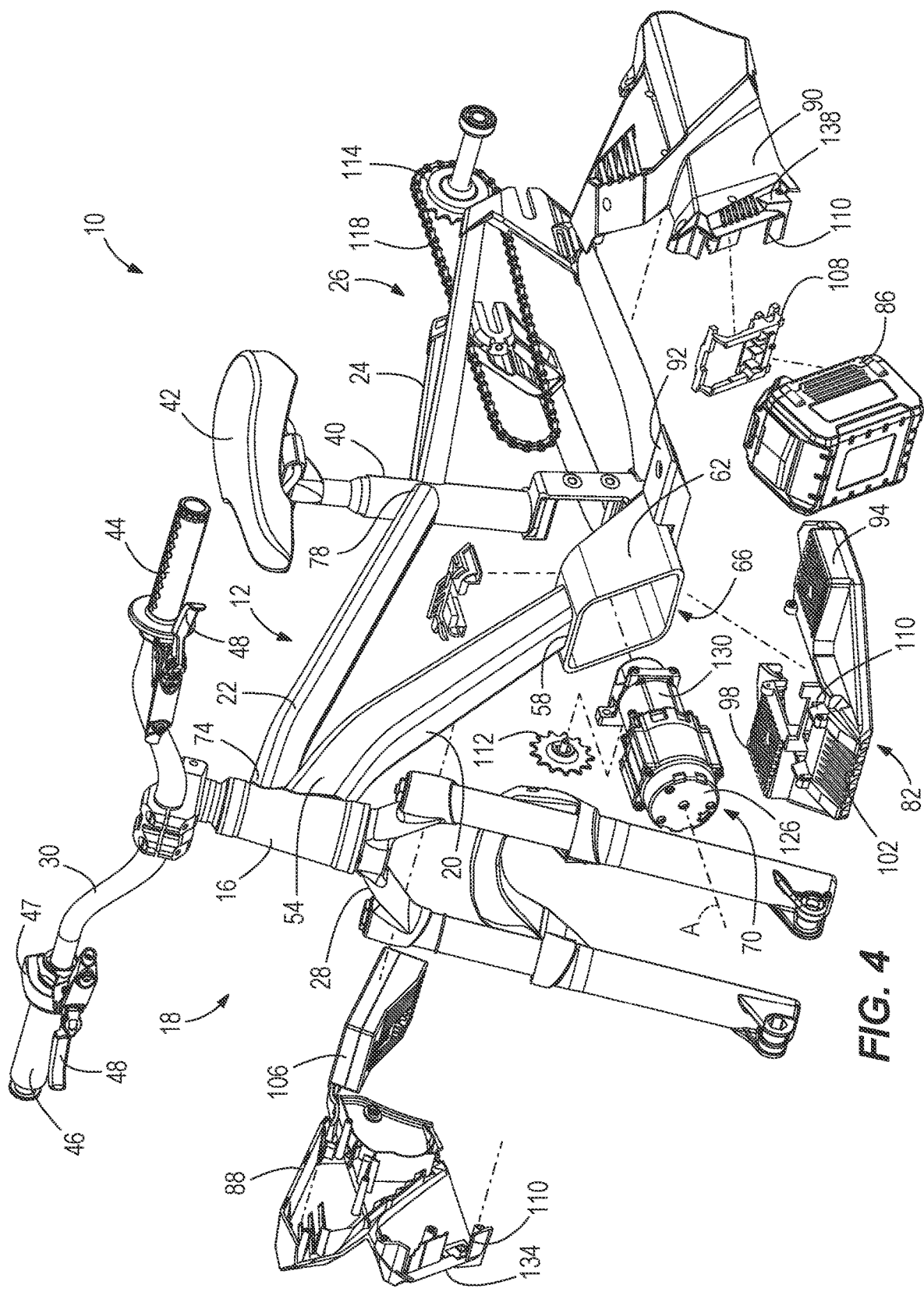
FIG. 4 is a perspective, exploded view of the running bike of FIG. 1

With continued reference to FIG. 4, the running bike 10 further includes a footrest 82 supported by the frame 12 adjacent the drive module enclosure 62, a battery pack 86 supported by the frame 12 adjacent the drive module enclosure 62, and a pair of side panels 88, 90. In the illustrated embodiment, the frame 12 includes support platforms 92 extending outward from the drive module enclosure 62, which supports the footrest 82. The running bike 10 has no pedals for manually driving the rear wheel 38. In the illustrated embodiment, the footrest 82 has a substantially U-shaped geometry that surrounds three sides (e.g., left, right, front sides) of the drive module enclosure 62. For example, the footrest includes a left portion 94, a right portion 98, and a front portion 102 connecting the left portion 94 to the right portion 98. The left and right portions 94, 98 each include a recess that is sized to receive a fastener that secures the footrest 82 to the support platforms 92. The support platforms 92 may form an integral part of the frame 12.

The pair of side panels 88, 90 are coupled to the frame 12 to enclose the drive module 70 within the drive module enclosure 62 and support an electronic control module 106. In the illustrated embodiment, the pair of side panels 88, 90 includes a left side panel 90 and a right side panel 88 that connect together and conform around portions of the frame 12, without any direct connection to the frame 12. In other constructions, the side panel(s) 88, 90 may have one or more direct connections to the frame 12. The left and right side panels 90, 88 are coupled to each other and the footrest 82. The combination of the side panels 88, 90 and the front portion 102 of the footrest 82 form a battery mount 110 at respective front ends of the side panels 88, 90. The battery mount 110 supports the battery pack 86, which provides electrical power to the drive module 70 of the drive module 70. In some constructions, the battery pack 86 is supported (e.g., by a sliding interface) for selective removal from the battery mount 110 so that the battery pack 86 can be removed for charging or replacement. The battery mount 110 provides both a mechanical interface for the battery pack 86 and an electrical interface for establishing a circuit between the battery pack 86 and the drive module 70 and the electronic control module 106, among other components. As described in more detail below, a battery support frame 108 may be selectively inserted within the battery mount 110 (e.g., coupled to the side panels 88, 90) to accommodate a second battery pack 186 (e.g., a larger battery). In some embodiments, the second battery pack 186 may be physically larger (e.g., have the same voltage but a larger Amphour rating), have a larger voltage, or the like.

With continued reference to FIG. 4, the drive module 70 includes the drive module 70 having a first sprocket 112, a second sprocket 114 coupled to the rear wheel 38, and a chain 118 extending between the first and second sprockets 112, 114. In the illustrated embodiment, the second sprocket 114 is a free wheel sprocket that freely allows the rear wheel 38 to rotate faster than the second sprocket 114, allowing the running bike 10 to coast when the drive module 70 is not activated. The running bike 10 further includes a chain cover 122 (FIG. 3) that protects the chain 118. The drive module 70 includes an electric motor 126, a gearbox 130 operably coupled to an output of the electric motor 126, and the first sprocket 112 which is coupled to an output shaft of the gearbox 130 and driven by the electric motor 126.

The drive module 70 can define a longitudinal axis A (FIG. 4), which in some constructions can be the central rotational axis of the electric motor 126 and/or gearbox 130. In some constructions, the longitudinal axis A can be parallel to the longitudinal axis of the running bike 10 (e.g., the front-rear direction 14). The drive module 70 is electrically connected to the electronic control module 106, the battery pack 86 and the throttle sensor on the grip 46 via electrical cables (not shown). The electronic control module 106 receives a signal from the throttle 47 to provide power to the electric motor 126. In the illustrated embodiment, the electric motor 126 is a brushless motor. In other embodiments, the motor may be a brushed motor or other motors of suitable function. The gearbox 130 includes a planetary gear reduction and a 90-degree angle drive output shaft 131 that is coupled to the first sprocket 112. While the illustrated drive module 70 includes the electric motor 126, the gearbox 130, and the sprocket 112, it should be appreciated that the drive module 70 may include more or less components, or similar components arranged differently. For example, the drive module 70 may only include the electric motor 126. In other embodiments, the drive module 70 may be integrated into the rear wheel 38 (e.g., as a hub motor).

Figure 5:
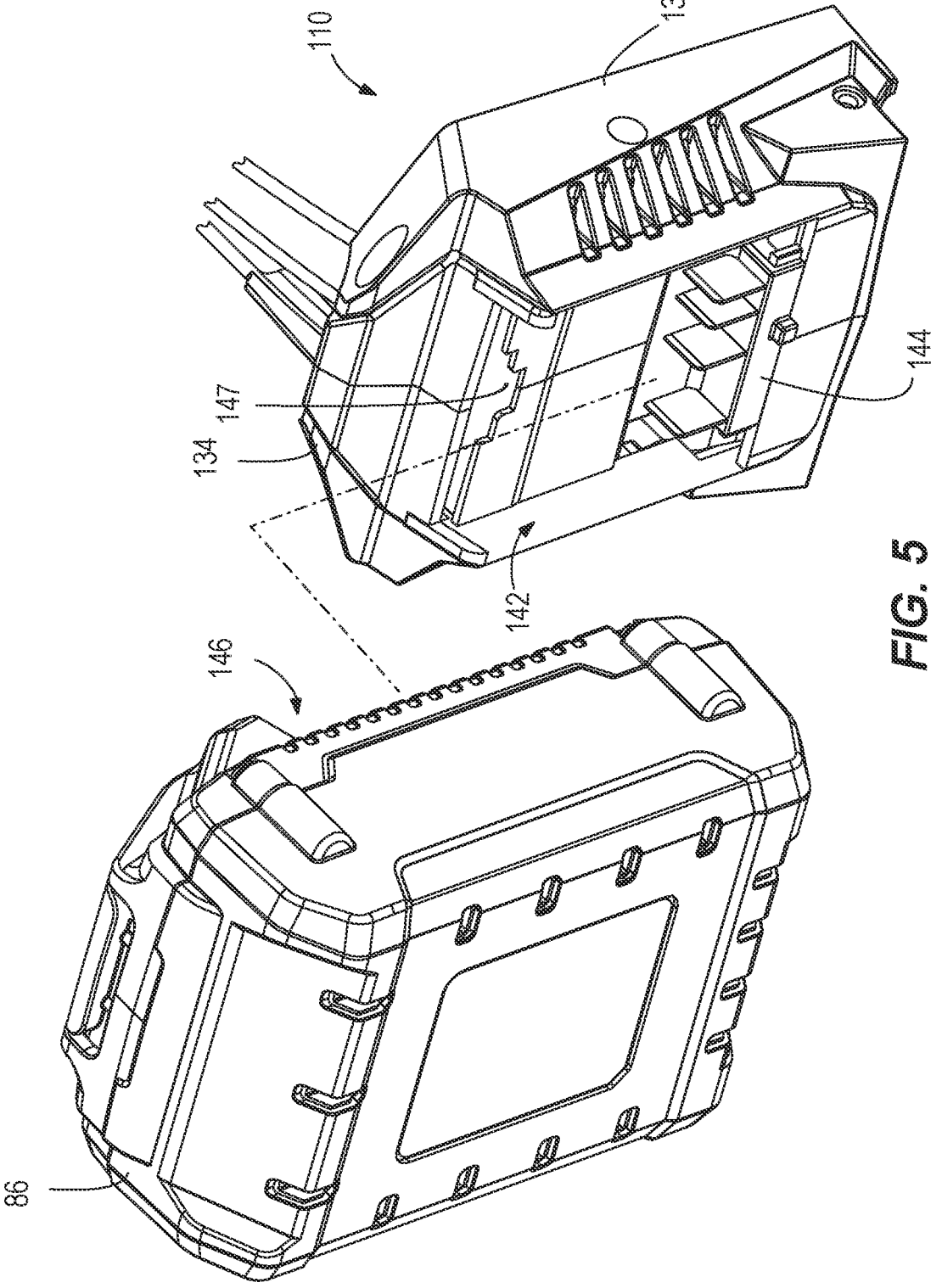
FIG. 5 is a front, perspective view of a battery mount of the running bike of FIG. 1 illustrating a first battery coupled to the battery mount.

Now with reference to FIG. 5, the battery mount 110 includes a first portion 134, a second portion 138 coupled to the first portion 134 in a clamshell connection, a battery connection interface 142 defined by the first and second portions 134, 138, and a connection terminal 144 supported within the battery connection interface 142. The battery pack 86 includes a corresponding connection interface 146 that mechanically connects the battery pack 86 to the battery connection interface 142 and electrically connects the battery pack 86 to the connection terminal 144 to form a circuit between the battery pack 86, the drive module 70, and the electronic control module 106, among other components. For example, the battery pack 86 is supported by a sliding interface with the battery connection interface 142 (e.g., formed as a channel or pocket for receiving at least a portion of the battery pack 86) for selective removal and attachment from the battery mount 110. The battery connection interface 142 further includes a latch receiving portion 147 that engages with a latch of the battery pack 86 to secure the battery pack 86 within the battery connection interface 142. In the illustrated embodiment, the battery pack 86 is a first battery pack having a first voltage (e.g., 18V).

In the illustrated embodiment, the first portion 134 of the battery mount 110 is integrally formed with the right side panel 88 and the second portion 138 is integrally formed with the left side panel 90. In other embodiments, the first and second portions 134, 138 of the battery mount 110 may be removably coupled to the side panels 88, 92 such that the battery mount 110 can be removed independently from the side panels 88, 92.

Figure 6:
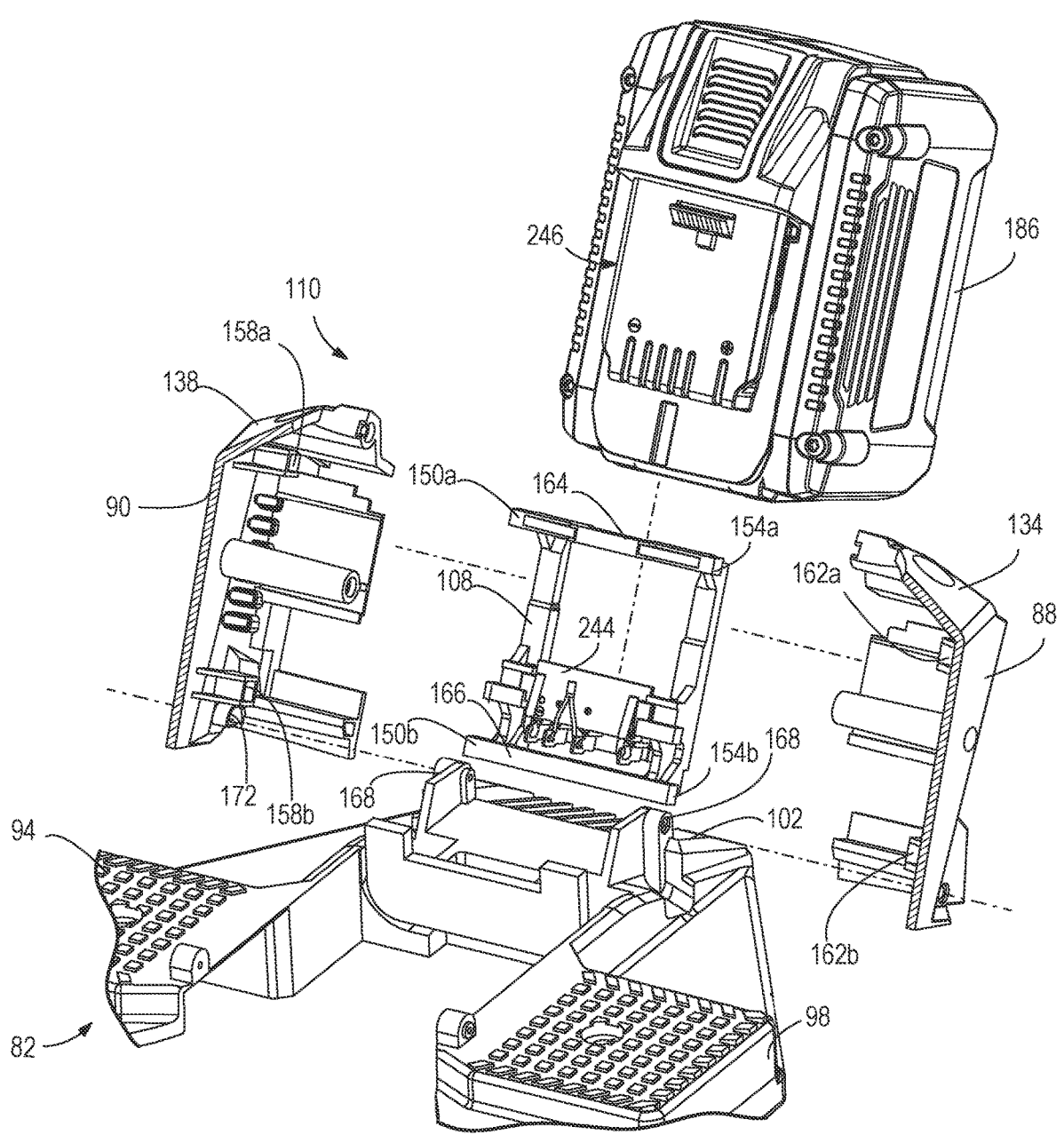
FIG. 6 is a rear, perspective exploded view of the battery mount of FIG. 5 illustrating a battery support frame coupled to side panels of the running bike to accommodate a second battery.
Figure 7:
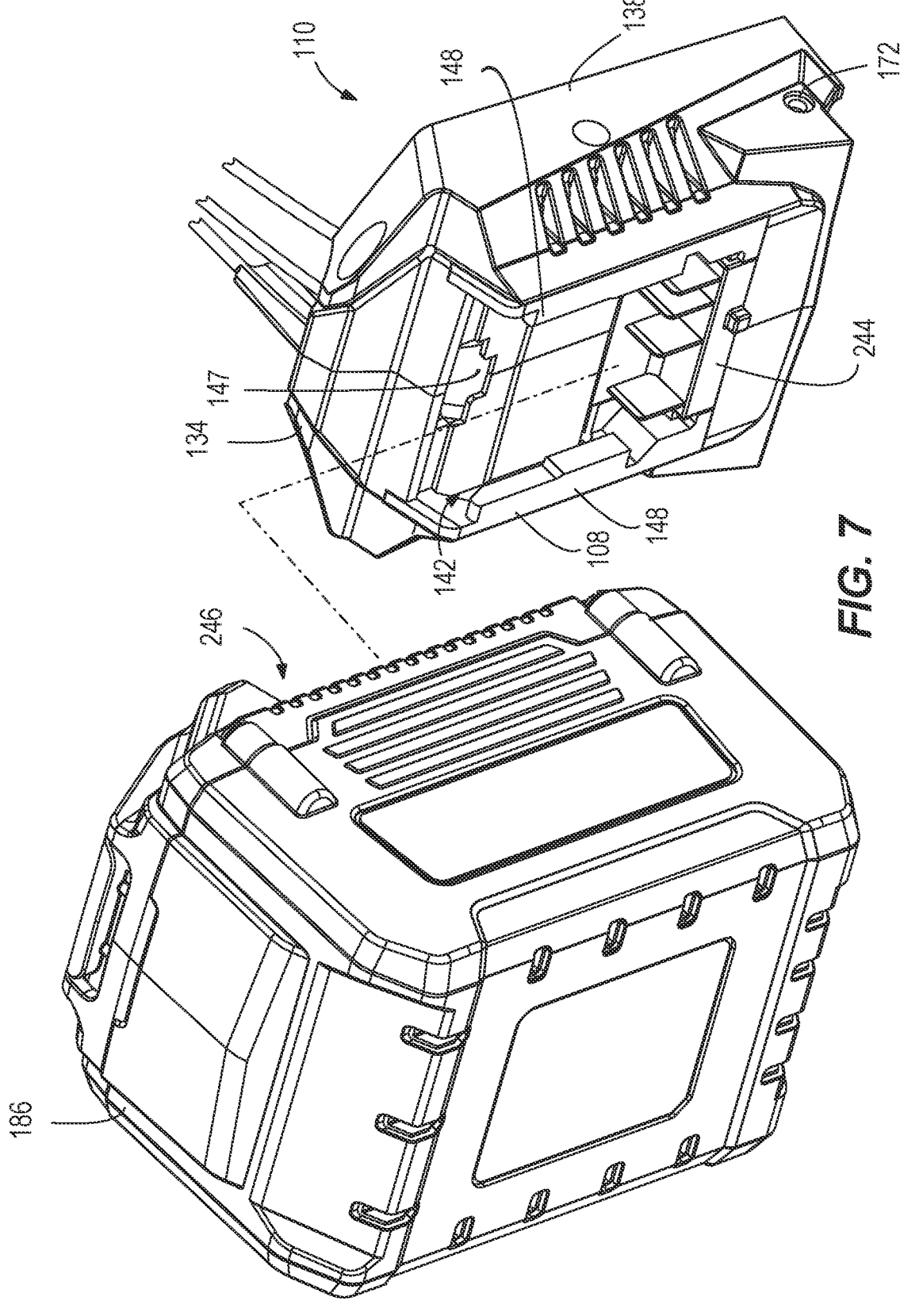
FIG. 7 is a front, perspective view of a battery mount of the running bike of FIG. 1 with the battery support frame so the battery mount can accommodate the second battery.

Now with reference to FIGS. 6 and 7, the battery support frame 108 and the first and second portions 134, 138 of the battery mount 110 formed in the side panels 88, 92 together form an interlock interface. The interlock interface selectively couples the battery support frame 108 to the first and second portions 134, 138 of the battery mount 110 formed in the side panels 88, 92. In the illustrated embodiment, the side panels 88, 90 include the interlock interface. Further, the side panels 88, 90 may be formed of a first material (e.g., a plastic material such as polyethylene, polypropylene, etc.) while the battery support frame 108 is formed of a second material (e.g., a metal material such as aluminum, steel, etc.) that is more rigid than the first material. Forming the battery support frame 108 of material with greater rigidity increases the rigidity of the battery mount 110 so the battery mount 110 can accommodate battery packs with a large weight.

It should be appreciated that the side panels 88, 90 may replace a standard side panel assembly without the interlock interface. In other words, the side panels 88, 90 may define a replacement side panel assembly and may be coupled to the bike 10 as described in more detail below. In some embodiments, the side panels 88, 90 may be the standard side panel assembly of the bike 10. In such embodiments, one or both of the side panels 88, 90 may be removed from the bike 10 and the battery support frame 108 is coupled to the side panel via the interlock interface as described in more detail below.

As shown in FIG. 7, the battery support frame 108 further includes support rails 148 positioned within the battery connection interface 142 of the battery mount 110. The support rails 148 extend along a direction which the battery pack 186 is slid into and out of the battery connection interface 142. The support rails 148 interact with a corresponding interface 246 of a second battery pack 186 to provide additional sliding support for the second battery pack 186 when the second battery pack 186 is inserted within the battery mount 110 and also provides an elongated support for supporting the weight of the second battery pack 186 when the battery pack 186 is secured within the battery mount. In the illustrated embodiment, the second battery pack 186 has a second voltage (e.g., 36V) that is greater than the voltage of the first battery pack 86. In other embodiments, the second battery pack 186 may have the same voltage, but weighs more than the first battery pack 86. In other words, coupling the battery support frame 108 to the battery mount 110 allows the battery mount 110 to accommodate a battery pack with a larger voltage or a battery pack weights more than the first battery pack 86.

A connection terminal 244 is coupled to the battery mount 110 and is configured to interact with the connection interface 246 of the second battery pack 186. In the illustrated embodiment, the connection terminal 244 is coupled to the battery mount 110 with the battery support frame 108. In embodiments where the second battery pack 186 has a voltage that is greater than the voltage of first battery pack, the second battery 186 can only be electrically connected to the connection terminal 244. In other words, the first battery pack 86 cannot be electrically connected to the connection terminal 244. In contrast, when the battery support frame 108 and connection terminal 244 are removed or not attached to the bike 10, the first battery pack 86 can only be electrically connected to the first connection terminal 144 (FIG. 5). In other words, the second battery pack 186 is not compatible with the first connection terminal 144, and first battery pack 86 is not compatible with the second connection terminal 244. As such, the connection terminal 144 may be removed and replaced with the connection terminal 244 when the battery support frame 108 is coupled to the battery mount 110. In other embodiments, the connection terminal 244 may include two separate connection interfaces that are separately configured to engage either the first battery pack 86 or the second battery pack 186. In other embodiments where the first and second battery packs 86, 186 have the same voltage, the same connection terminal 144 may be used for each battery pack.

Now with reference to FIG. 6, the battery support frame 108 includes a first pair of connection posts 150a, 150b (e.g., left connection posts) and a second pair of connection posts 154a, 154b (e.g., right connection posts). The left side panel 88 includes a first pair of mating apertures 158a, 158b sized to receive the first pair of connection posts 150a, 150, and the right side panel 90 includes a second pair of mating apertures 162a, 162b sized to receive the second pair of connection posts 154a, 154b. The combination of the connection posts 150a, 150b, 154a, 154b and the mating apertures 158a, 158b, 162a, 162b together form the interlock interface.

In the illustrated embodiment, the battery support frame 108 includes an upper guide rail 164 that defines one of the first pair of connection posts 150*a* (e.g., an upper, left connection post 150*a*) and one of the second pair of connection posts 154*a* (e.g., an upper, right connection post) such that the connection posts 150*a*, 154*a* extend along a common axis, which is also shared with the mating apertures 158*a*, 162*a*. The battery support frame 108 further includes (parallel to the upper guide rail 164) a lower guide rail 166 that defines the other one of the first pair of connection posts 150*b* (e.g., a lower, left connection post) and the other one of the second pair of connection posts 154*b* (e.g., an lower, right connection post) such that the connection posts 150*b*, 154*b* extend along a common axis, which is also shared with the mating apertures 158*b*, 162*b*. As such, the battery support frame 108 includes, along two parallel axes, four connections posts 150*a*, 150*b*, 154*a*, 154*b* that are received in four mating apertures 158*a*, 158*b*, 162*a*, 162*b*. In other embodiments, the battery support frame 108 may include more (e.g., five, six, etc.) or less (e.g., three, two, etc.) connection posts and the side panels 88, 90 may include a corresponding amount of mating apertures, and the left/right portions of the interface may or may not be coaxially aligned with each other. In other embodiments, the battery support frame 108 may include one or more of the mating apertures while the side panels 88, 90 include one or more of the connection posts.

To couple the battery support frame 108 to the battery mount 110, one or both of the side panels 88, 90 are removed or uncoupled from the bike 10. In some embodiments, the side panels 88, 90 may replace a standard side panel assembly that lacks an interlock interface for the battery support frame 108. The battery support frame 108 is coupled to the side panels 88, 90 via the interlock interface. For example, the first pair of connection posts 150*a*, 150*b* are inserted within the first pair of mating apertures 158*a*, 158*b* of the first side panel 90. The first side panel 90 is positioned adjacent the footrest 82 and the second side panel 88 is coupled to the first side panel 90 such that the second pair of connection posts 154*a*, 154*b* are aligned with the mating aperture 162*a*, 162*b*. In some embodiments, the first connection terminal 144 is removed from the battery mount 110 and the second connection terminal 244 is coupled to the battery support frame 108 prior to the second side panel 88 being coupled to the first side panel 90. Once the first and second side panels 88, 90 are coupled together, the side panels 88, 90 are coupled to the bike through a connection with the footrest 82. For example, the front portion 102 of the footrest 82 includes a pair of connection structures 168 such as bosses (FIG. 6) that aligns with a connection aperture 172. A fastener (not shown) may extend through the connection aperture 172 and engage the connection structure 168 (e.g., via an aperture therein) to secure the side panels 88, 90 to the footrest 82. Additionally, or alternatively, the side panel 88, 90 may be directly coupled to the frame 24 or indirectly coupled to the frame 24 through another component.

Various aspects of the invention are set forth in the following claims.

What is claimed is:

1. A bike comprising:
a frame elongated in a longitudinal direction;
a front fork rotatably engaged with a front wheel at a front end of the bike;
a rear fork rotatably engaged with a rear wheel at a rear end of the bike;

a handlebar supported with the front fork for rotation at the front end of the frame for steering the bike;
a drive module configured to drive the rear wheel of the bike when operated selectively with power;
a battery mount coupled to the frame, the battery mount including:
a first portion,
a second portion selectively coupled to the first portion,
a battery connection interface defined by the first and second portions, and
a connection terminal supported within the battery connection interface;
a battery support frame defining a support rail configured to be positioned within the battery connection interface, the battery support frame configured to be removably coupled to the battery mount by an interlock interface defined by the first and second portions of the battery mount and the battery support frame; and
a battery pack selectively received within the battery connection interface, the battery pack including a corresponding interface that interacts with the battery connection interface, the support rail, and the connection terminal to provide a mechanical and an electrical interface between the battery pack and the battery mount to selectively provide power to the drive module.

2. The bike of claim 1, further comprising a left side panel and a right side panel that connect together to enclose at least a portion of the drive module and form the battery mount at respective front ends thereof.

3. The bike of claim 2, wherein the first portion of the battery mount is integrally formed with the right side panel and the second portion of the battery mount is integrally formed with the left side panel.

4. The bike of claim 1, wherein the drive module further comprises:
an electric motor;
a gear box coupled to the electric motor, the gear box having an output shaft; and
a first sprocket coupled to and driven by the output shaft of the gear box.

5. The bike of claim 1, wherein the interlock interface includes one or more connection posts defined by one of the battery support frame or the battery mount and one or more mating apertures formed on the other one of the battery support frame or the battery mount.

6. The bike of claim 1, wherein
the battery support frame includes a first pair of connection posts and a second pair of connection posts,
the first portion of the battery mount includes a first pair of mating apertures sized to receive the first pair of connection posts,
the second portion of the battery mount includes a second pair of mating apertures sized to receive the second pair of connection posts, and
wherein the first and second pair of connection posts and the first and second pair of mating apertures together form the interlock interface.

7. The bike of claim 6, wherein the battery support frame includes an upper guide rail that defines one of the first pair of connection posts and one of the second pair of connection posts, and the battery support frame includes a lower guide rail that defines the other one of the first pair of connection posts and the other one of the second pair of connection posts.

8. The bike of claim 1, wherein the first and second portions of the battery mount are provided by left and right side panels that encompass a portion of the frame, the bike further comprising an electronic control module electrically coupled to the drive module and supported by one or both of the left and right side panels.

9. The bike of claim 1, wherein the battery pack is one of at least two battery packs for the bike, the bike further comprising an alternate battery pack with a lower voltage than the battery pack, the alternate battery pack configured to be received within the battery connection interface when the battery support frame is uncoupled from the battery mount.

10. The bike of claim 9, wherein a first connection terminal is configured to be coupled to the battery mount when the battery support frame is uncoupled from the battery mount, the connection terminal is a second connection terminal configured to be coupled to the battery mount when the battery support frame is coupled to the battery mount, the first battery pack can only be electrically connected to the first connection terminal, and the second battery pack can only be electrically connected to the second connection terminal.

11. A bike comprising:

a frame elongated in a longitudinal direction;

a front fork rotatably engaged with a front wheel at a front end of the bike;

a rear fork rotatably engaged with a rear wheel at a rear end of the bike;

a handlebar supported with the front fork for rotation at the front end of the frame for steering the bike;

a drive module configured to drive the rear wheel of the bike when operated selectively with power;

a first side panel configured to be coupled to a first side of the bike;

a second side panel configured to be coupled to a second side of the bike, wherein the first and second side panels define a battery mount having a battery connection interface;

a connection terminal supported within the battery connection interface;

a battery support frame defining a support rail configured to be positioned within the battery connection interface, the battery support frame configured to be removably coupled to the battery mount by an interlock interface defined by the first and second side panels and the battery support frame; and a battery pack selectively received within the battery connection interface, the battery pack including a corresponding interface that interacts with the battery connection interface, the support rail, and the connection terminal to provide a mechanical and an electrical interface between the battery pack and the battery mount to selectively provide power to the drive module.

12. The bike of claim 11, wherein first and second side panels connect together to enclose at least a portion of the drive module and form the battery mount at respective front ends thereof.

13. The bike of claim 11, wherein the interlock interface includes one or more connection posts defined by one of the battery support frame or the battery mount and one or more mating apertures formed on the other one of the battery support frame or the battery mount.

14. The bike of claim 11, wherein the battery support frame includes a first pair of connection posts and a second pair of connection posts, the first portion of the battery mount includes a first pair of mating apertures sized to receive the first pair of connection posts, the second portion of the battery mount includes a second pair of mating apertures sized to receive the second pair of connection posts, and the first and second pair of connection posts and the first and second pair of mating apertures together form the interlock interface.

15. The bike of claim 14, wherein the battery support frame includes an upper guide rail that defines one of the first pair of connection posts and one of the second pair of connection posts, and the battery support frame includes a lower guide rail that defines the other one of the first pair of connection posts and the other one of the second pair of connection posts.

16. The bike of claim 11, further comprising an electronic control module supported by one or more of the first and second side panels.

17. The bike of claim 11, wherein the battery pack is one of at least two battery packs for the bike, the bike further comprising an alternate battery pack with a lower voltage than the battery pack, the alternate battery pack configured to be received within the battery connection interface when the battery support frame is uncoupled from the battery mount.

18. The bike of claim 17, wherein the connection terminal is one of at least two connection terminals for the bike, the bike further comprises an alternate connection terminal that is configured to be coupled to the battery mount when the battery support frame is uncoupled from the battery mount, the first battery pack is compatible with the connection terminal and not compatible with the alternate connection terminal, and the second battery pack is compatible with the alternate connection terminal and not compatible with the connection terminal.

19. A method of assembling a bike, the method comprising:

providing a frame elongated in a longitudinal direction, coupling a drive module to the frame, the drive module configured to selectively provide power to the bike;

coupling a first side panel to the frame, the first side panel defining a first portion of a battery mount, coupling a battery support frame to the first side panel, the battery support frame defining a support rail, coupling a second side panel to the frame and the first side panel, the second side panel defining a second portion of the battery mount, and wherein coupling the second side panel to the first side panel defines a battery connection interface of the battery mount and couples the battery support frame to the battery mount by an interlock interface so the support rail is positioned within the battery connection interface.

20. The method of claim 19, wherein coupling the battery support frame to the first side panel includes aligning a first pair of connection posts defined by the battery support frame with a first pair of mating apertures formed in the first side panel, and wherein coupling the second side panel to the first side panel includes aligning a second pair of connection posts defined by the battery support frame with a second pair of mating apertures formed in the second side panel.

\*  \*  \*  \*  \*